Feb. 25, 1947.   F. E. SMITH   2,416,357
FRICTION SEAL COUPLING
Filed June 5, 1944
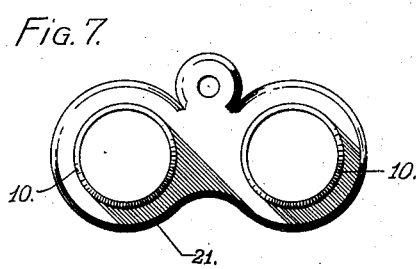
Fig. 7.
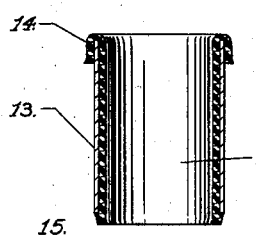
Fig. 3.
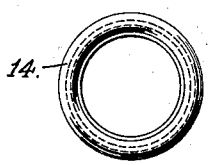
Fig. 4.
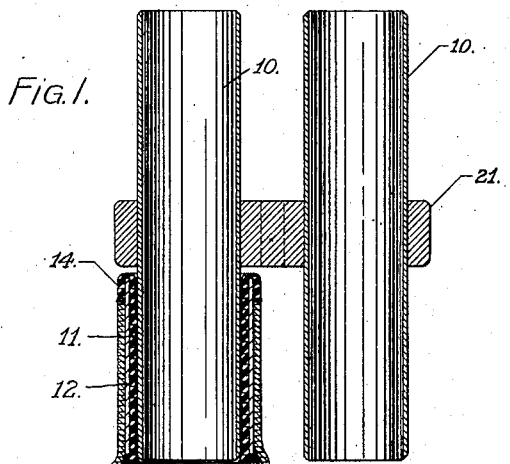
Fig. 1.
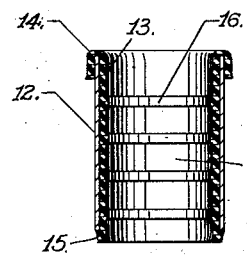
Fig. 2.
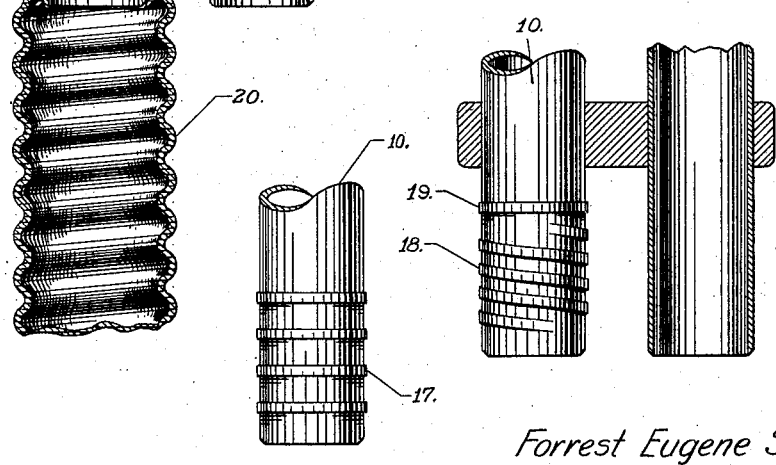
Fig. 5.   Fig. 6.
Forrest Eugene Smith.
INVENTOR
BY 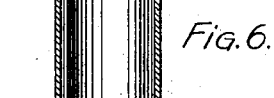
ATTORNEY Patented Feb. 25, 1947

2,416,357

UNITED STATES PATENT OFFICE 2,416,357

FRICTION SEAL COUPLING

Forrest Eugene Smith, United States Navy

Application June 5, 1944, Serial No. 538,799

3 Claims. (Cl. 285—71)

(Granted under the act of March 3, 1883, as amended April 30, 1928; 370 O. G. 757)

This invention relates to a coupling unit and more particularly to a friction seal coupling for flexible tubing.

The principal object of the invention is to provide a coupling unit particularly adapted for the tubing of aviators' low pressure oxygen supply.

It is another object of the invention to provide a coupling unit for flexible tubing that may be quickly and easily attached or detached therefrom, at the same time providing an air-tight seal against moderate pressures, and which possesses resistance to accidental separation.

With the above and other objects in view the invention consists in the construction, combination and arrangement of parts as will be described more fully hereinafter.

Reference is to be had to the accompanying drawings, forming a part of this specification, wherein like reference characters indicate corresponding parts throughout the several views, and in which Fig. 1 is a longitudinal sectional view of an application of the invention, Fig. 2 is a longitudinal sectional view of a bushing like connector used in the coupling unit, Fig. 3 is a similar view of a modified form of connector, Fig. 4 is a top plan view of either Fig. 2 or Fig. 3, Fig. 5 is an elevation of a modified form of a body member used with the connector shown in Fig. 2, Fig. 6 is a view showing a modification of the locking ridges on the body member, and Fig. 7 is a top plan view of a yoke used to support the body member.

The coupling unit now to be described consists of a body member and one or more bushing like connector members. The body member is preferably cylindrical in cross-section over the end or ends of which the connectors are frictionally forced. Each of the connectors consists of a rubber tube having a plurality of internal annular ridges and being vulcanized inside of an outer shell, preferably made of metal. One end of the rubber tube is folded back and vulcanized to the outer side of the sleeve, while the other end of the tube forms a seat upon which the sleeve rests, thus providing firm connection between the two elements.

Referring more particularly to Fig. 1 of the drawings, 10 indicates a body member which is tubular in form and preferably made from a metallic material, although it will function successfully if made from a plastic composition.

The exterior wall of the body member is preferably smooth so that a connector 11 may be easily placed in position on it. The connector itself comprises a metal sleeve 12, Fig. 2, to the inner surface of which there is suitably vulcanized a rubber tube 13 having its upper edge folded back and vulcanized to the exterior of the sleeve, as at 14, and its lower end extending laterally outward to form a seat 15 on which the sleeve will rest. An additionally firm attachment is thus maintained between the sleeve and rubber lining. The bore of the rubber tube is provided with a plurality of annular ridges 16 which provide frictional bearing surfaces against the exterior of the body member. These ridges form a leak-proof seal with the body member and firmly hold the body member and connector together against accidental separation by mechanical pull, but at the same time permit easy disconnection by deliberate manual pull. In the drawings there is shown but one such connector, but it is to be understood that a connector can be applied to each end of the body member so that two lengths of hose may be coupled together should occasion arise.

Although there has been described a coupling unit in which the sealing ridges are formed on the interior of the connector, it may be more advantageous to have them on the body member. In such a case they may be formed integrally with the material of which the body member is made, as at 17 in Fig. 5. When the ridges are formed on the body member as just mentioned, the smooth bored connector of Fig. 3 is used. Either construction affords a firm hold between the parts and prevents leakage.

Another arrangement of the raised sealing means may be used without in any manner lessening the effectiveness of the seal or the tightness of the binding of the parts. This modified arrangement is illustrated in Fig. 6 wherein there is shown a spiral ridge 18 with a single annular ridge 19. Of course, the spiral ridge may be used without the annular ridge, or if desired, a plurality of annular ridges may be used. The spiral ridge provides an efficient locking action between the body member and connector, yet at the same time permits easy manual separation of the parts by a twisting movement.

To assemble the coupling unit as shown in Fig. 1, the connector 11 is first inserted in the open end of a hose 20 until the folded-back portion of its rubber lining abuts against the edge of the hose, forming a tight joint therebetween. The body member 10 is then forced into the connector by a direct push or by a twisting motion depending on whether the annular or spiral form of ridge is used. When assembled, a plurality of units may be held together in a rigid or semi-rigid yoke 21, as shown in Figs. 1 and 6.

It will be understood that the above description and accompanying drawings comprehend only the general and preferred embodiment of the invention and that various changes in details of construction, proportion and arrangement of parts may be made within the scope of the appended claims and without sacrificing any of the advantages of the invention.

The invention described herein may be manufactured and used by or for the Government of the United States for governmental purposes without the payment to me of any royalty thereon.

What is claimed as new is:

1. A coupling unit for flexible tubing comprising a body member, a connector comprising an outer shell and a resilient lining having a portion overlapping the shell to provide a lock therebetween and a portion laterally extended to provide a seat for the shell, and means on one of said members for engaging another of said members to provide a leakproof seal therebetween.

2. A coupling unit for flexible tubing comprising a body member, a connector, and a plurality of annular ridges on one of said members to engage with the other of said members to provide a frictional bond and leakproof seal between said members when in functional engagement.

3. A coupling unit for flexible tubing comprising a body member, a connector, and a spiral ridge on one of said members to engage with the other of said members to provide a frictional bond and leakproof seal between said members when in functional engagement.

FORREST EUGENE SMITH.

REFERENCES CITED

The following references are of record in the file of this patent:

UNITED STATES PATENTS

| Number | Name | Date |
|---|---|---|
| 2,053,626 | Parker | Sept. 8, 1936 |
| 2,131,316 | Ellis | Sept. 27, 1938 |
| 2,338,316 | Buzzell | Jan. 4, 1944 |

FOREIGN PATENTS

| Number | Country | Date |
|---|---|---|
| 253,636 | British | 1926 |